Sept. 11, 1951 F. M. GOODWIN 2,567,599
RAT TRAP
Filed Oct. 1, 1947

F. M. Goodwin
INVENTOR,
BY C. A. Snow & Co.
ATTORNEYS.

Patented Sept. 11, 1951

2,567,599

UNITED STATES PATENT OFFICE 2,567,599

RAT TRAP

Frank M. Goodwin, Buffalo, N. Y.

Application October 1, 1947, Serial No. 777,191

2 Claims. (Cl. 43—66)

This invention relates to traps, and more specifically, to traps designed for trapping rodents.

The primary object of the invention is to provide a trap which will be ever set to the end that the trap will continue to operate to catch rodents, to the capacity of the trap.

An important object of the invention is to provide a trap including a housing, and a pivoted closure mounted within the entrance opening of the housing, the closure being so constructed and arranged that it will move to admit a rodent, but will automatically return to its normal position to prevent rodents trapped within the housing, escaping through the entrance opening.

Still another object of the invention is to provide means for preventing rodents trapped within the housing from passing out of the housing through the entrance opening, while the entrance opening has swung to its open position by the action of a rodent entering the housing through the pivoted closure.

A further object of the invention is to provide a pivoted member with prongs which extend inwardly and are so disposed that they will protect the closure against rodents forcing their way through the closure to liberate themselves.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention.

Referring to the drawings

Figure 1:
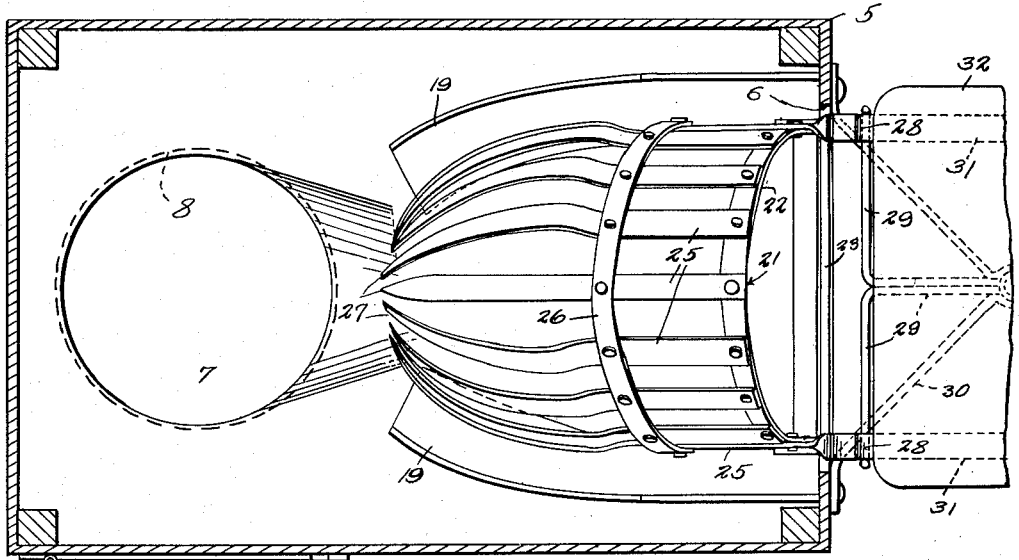
Figure 1 is a transverse sectional view through the trap directly under the cover.

Referring to the drawings in detail, the housing of the trap is indicated generally by the reference character 5, and is provided with an entrance opening 6, and an outlet opening 7 which outlet opening is guarded by a downwardly extended annular flange 8 that extends into a receptacle or container containing food over the open end of which the housing is positioned, and which is not shown in the present drawing.

Arranged within the housing and extending inwardly from the front wall of the housing adjacent to the entrance opening, are spaced partitions 19 that are of such heights that when the closure is swung upwardly by a rodent passing into the entrance opening, the spaces at the sides of the closure will be guarded against rodents or rats passing from the housing.

As shown by Figure 1 of the drawing, the spaced partitions 19 are curved inwardly forming a contracted passageway at the inner ends of the partitions sufficiently large to permit a rat to pass therethrough.

The entrance opening 6 of the housing is guarded by the pivoted closure indicated generally by the reference character 21.

This closure 21 comprises a bowed supporting member 22 which extends upwardly within the entrance opening, the lower ends thereof being secured to the bar 23 that rests on the floor 24 of the housing, at a point within the entrance opening.

Extending forwardly within the housing of the trap, are fingers 25 that are secured to the bowed supporting member 22 at their inner ends, a bowed member 26 connects the fingers at points intermediate their ends, maintaining the fingers in proper spaced relation with respect to each other.

Figure 2:
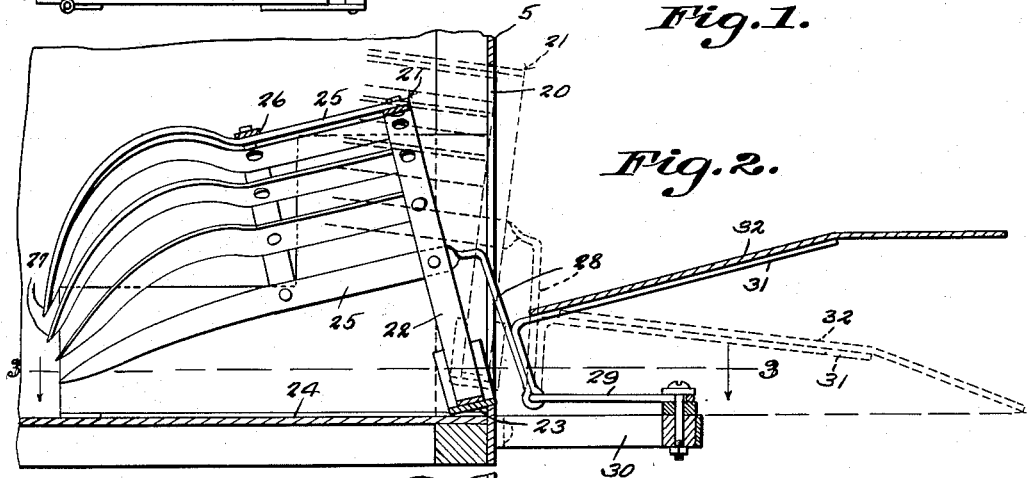
Fig. 2 is a vertical sectional view through a portion of the trap.
Figure 3:
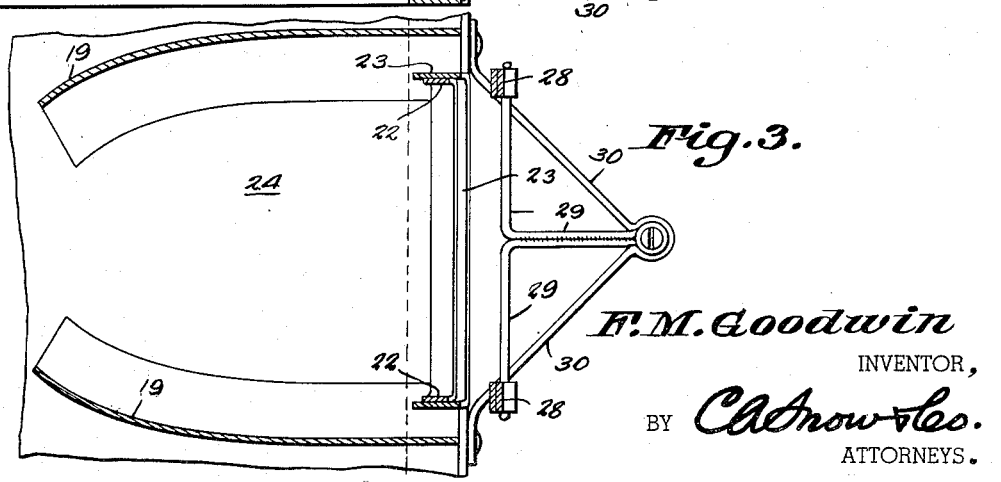
Fig. 3 is a sectional view taken on line 3—3 of Fig. 2.

As clearly shown by Figure 2 of the drawings, the free ends of the fingers 25 are formed into prongs 27 that curve downwardly to guard the entrance opening against rodents caught in the housing, from passing therefrom through the entrance opening.

The lowermost fingers 25 at opposite sides of the closure 21, are exceptionally long and extend downwardly as at 28 where they are grouped around the arms 29 of the closure support, the arms 29 being secured to the bracket 30 which extends forwardly from the housing adjacent to the bottom thereof.

The long fingers 25 now are extended upwardly along the downwardly extended portions 28, as shown by Figure 2, and then outwardly at substantially right angles, providing the supporting arms 31 for the treadle 32 over which the rodents pass on entering the trap.

In the operation of this form of trap, it will be obvious that rodents will pass onto the treadle 32, the weight of the rodents overbalancing the closure, to move the closure to the dotted line position shown by Figure 2 of the drawing. This leaves the entrance opening clear so that the rodents may pass into the entrance opening. As the rodents enter the housing and pass under the prongs 27, the weight of the prongs will overbalance the closure moving the prongs to the positions shown in full lines in Figure 2 of the drawing, guarding the opening against rodents passing from the trap to escape.

From the foregoing, it is believed that the construction and operation of the trap will be clear, and that a further detail disclosure is unnecessary.

What is claimed is:

1. A rodent trap comprising a housing having an entrance opening at one end thereof, a closure pivotally mounted within the entrance opening, said closure comprising a bowed supporting member, a plurality of fingers arranged in spaced relation with respect to each other, secured to the bowed supporting member, said fingers providing a guard curved to conform with the curvature of the bowed supporting member, certain of said fingers being longer than the remaining fingers and extending forwardly beyond the bowed supporting member, the forwardly extended ends of said certain fingers constituting a support, means for pivotally connecting the forwardly extended ends of said certain fingers to the housing, and a treadle mounted on the forwardly extended ends of said certain fingers, all of said fingers being heavier than the treadle thereby normally overbalancing the treadle to close the entrance opening, the ends of said fingers within said housing being pointed to prevent the escape of rodents through the entrance opening.

2. A rodent trap comprising a housing having an entrance opening at one end thereof, a closure embodying a plurality of spaced fingers extending into the housing, the ends of said fingers within the housing being pointed, certain of said fingers being longer than the remaining fingers and extending outwardly beyond the forward end of the housing, said certain fingers being bent upon themselves to provide bearings and a treadle support, and arms for pivotally mounting said bearings, the weight of the closure being greater than the weight of the treadle, said closure normally closing the entrance opening, and said closure being movable upwardly to open the entrance opening under the weight of a rodent passing onto the treadle.

FRANK M. GOODWIN.

REFERENCES CITED

The following references are of record in the file of this patent:

UNITED STATES PATENTS

| Number | Name | Date |
|---|---|---|
| 429,254 | Barry | June 3, 1890 |
| 729,786 | McDaniel | June 2, 1903 |
| 872,556 | Carwile | Dec. 3, 1907 |
| 1,446,609 | Baylor | Feb. 27, 1923 |

FOREIGN PATENTS

| Number | Country | Date |
|---|---|---|
| 581,127 | France | Sept. 20, 1924 |